(12) United States Patent
Kemler

(10) Patent No.: US 11,530,746 B2
(45) Date of Patent: Dec. 20, 2022

(54) METHOD AND CONTROL UNIT FOR OPERATING A TRANSMISSION OF A MOTOR VEHICLE

(71) Applicant: ZF Friedrichshafen AG, Friedrichshafen (DE)

(72) Inventor: Johannes Kemler, Lindau (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/527,650

(22) Filed: Nov. 16, 2021

(65) Prior Publication Data

US 2022/0154821 A1 May 19, 2022

(30) Foreign Application Priority Data

Nov. 17, 2020 (DE) .................. 10 2020 214 422.2

(51) Int. Cl.
*F16H 59/36* (2006.01)
*F16H 61/16* (2006.01)
*F16H 61/08* (2006.01)
*F16H 63/50* (2006.01)

(52) U.S. Cl.
CPC ............ *F16H 61/16* (2013.01); *F16H 59/36* (2013.01); *F16H 61/08* (2013.01); *F16H 63/50* (2013.01); *F16H 2059/363* (2013.01); *F16H 2302/06* (2013.01)

(58) Field of Classification Search
CPC .... F16H 59/36; F16H 2059/363; F16H 61/08; F16H 61/16; F16H 63/50; F16H 2302/06
See application file for complete search history.

(56) References Cited

U.S. PATENT DOCUMENTS

| 5,669,849 A * | 9/1997 | Tabata ................. B60W 10/04 477/109 |
| 6,478,713 B1 * | 11/2002 | Runde ................. B60W 10/115 477/109 |
| 7,090,616 B2 | 8/2006 | Henneken et al. |

(Continued)

FOREIGN PATENT DOCUMENTS

| DE | 4329007 A1 | 3/1994 |
| DE | 19961979 A1 | 8/2001 |

(Continued)

OTHER PUBLICATIONS

German Search Report De 10 2020 214 422.2, dated Apr. 14, 2021. (10 pages).

*Primary Examiner* — Edwin A Young
(74) *Attorney, Agent, or Firm* — Dority & Manning, P.A.

(57) ABSTRACT

A method for operating a transmission (2) of a motor vehicle includes, in order to trigger a gear shift in the transmission (2), determining a trigger speed depending on a response time of the gear shift to be implemented, depending on a gradient of a motor vehicle-side rotational speed, and depending on a maximum permissible limit speed for the motor vehicle-side rotational speed. The gear shift to be implemented triggered on a control side as function of the trigger speed such that the motor vehicle-side rotational speed does not exceed the maximum permissible limit speed during the implementation of the gear shift. The method also include adapting the trigger speed.

11 Claims, 3 Drawing Sheets

(56) References Cited

U.S. PATENT DOCUMENTS

| | | | |
|---|---|---|---|
| 2006/0211536 A1* | 9/2006 | Guggolz | B60W 10/06 477/34 |
| 2012/0173102 A1 | 7/2012 | Swartling et al. | |
| 2013/0045836 A1* | 2/2013 | Weller | B60W 30/19 477/80 |

FOREIGN PATENT DOCUMENTS

| | | |
|---|---|---|
| DE | 102006016710 A1 | 10/2007 |
| DE | 102007045339 A1 | 4/2009 |
| DE | 102008010280 A1 | 8/2009 |

* cited by examiner

METHOD AND CONTROL UNIT FOR OPERATING A TRANSMISSION OF A MOTOR VEHICLE

CROSS-REFERENCE TO RELATED APPLICATION

The present application is related and has right of priority to German Patent Application No. 102020214422.2 filed in the German Patent Office on Nov. 17, 2020, which is incorporated by reference in its entirety for all purposes.

FIELD OF THE INVENTION

The invention relates generally to a method for operating a transmission of a motor vehicle. Moreover, the invention relates generally to a control unit for operating a transmission of a motor vehicle.

BACKGROUND

A motor vehicle includes a prime mover and a transmission connected between the prime mover and a driven end. During an implementation of a gear shift in the transmission, i.e., during an implementation of a gear change, a changeover takes place from an actual gear of the implementing gear shift into a target gear of the gear shift to be implemented. A gear shift is triggered on the control side when a motor vehicle-side rotational speed, in particular a rotational speed of the prime mover or a rotational speed of the driven end, reaches a trigger speed. The rotational speed of the driven end is in a defined ratio with the rotational speed of the prime mover depending on the ratio of the actual gear.

DE 10 2006 016 710 A1 describes a method for operating a transmission of a motor vehicle, namely for triggering a gear shift in the transmission, in which a maximum permissible prime mover speed, on the one hand, and, on the other hand, a gear change-maximum prime mover speed, which is lower than the maximum permissible prime mover speed, are predefined. If the prime mover speed should exceed the maximum permissible prime mover speed, the prime mover speed must be governed. In order to prevent this, the gear change-maximum prime mover speed is lower than the maximum permissible prime mover speed. It is known from DE 10 2006 016 710 A1 that the trigger speed, at which the gear shift to be implemented is triggered on the control side, is to be determined depending on the gear change-maximum prime mover speed, depending on a gradient of the prime mover speed, and depending on a response time of the gear shift to be implemented. The response time of a gear shift to be implemented is the period of time that passes after a control-side triggering of the gear shift until a speed transition begins to transition the prime mover speed from the synchronous speed of the actual gear of the gear shift to be implemented to the synchronous speed of the target gear of the gear shift to be implemented.

In order to ensure the sportiest gear shifts possible, a gear shift is to be triggered as late as possible and, in fact, at a highest possible, permissible limit speed for the gear shift to be implemented, which means that the gear change-maximum prime mover speed is to be as close as possible to the maximum permissible prime mover speed.

The gradient of the motor vehicle-side rotational speed, as a function of which the trigger speed for triggering a gear shift is determined, is not exactly known. In known methods, this can result in a trigger speed for triggering a gear shift to be implemented being erroneously determined and, for the case in which the limit speed for the gear shift to be implemented, which is also referred to as the gear change-maximum prime mover speed, is close to the maximum permissible prime mover speed, the prime mover speed exceeds the maximum permissible prime mover speed during the implementation of the gear shift, and so the prime mover speed must then be governed. This is disadvantageous.

There is a need to more precisely ascertain the trigger speed for a gear shift to be implemented in a transmission of a motor vehicle, and so, on the one hand, acceleration losses can be avoided during the implementation of the gear shift and, on the other hand, an intervention of a governor that governs a prime mover speed is avoided during the implementation of the gear shift.

SUMMARY OF THE INVENTION

Example aspects of the invention provide a method for operating a transmission of a motor vehicle. According to example aspects of the invention, the trigger speed, as a function of which the gear shift to be implemented in the transmission is triggered on the control side, is adapted depending on a driver-input torque. The trigger speed can be advantageously adapted for the gear shift to be implemented depending on the driver-input torque. Shift points that are too low, with acceleration losses, as well as an intervention of a governor that governs the prime mover speed can be avoided.

According to one advantageous example refinement of the invention, the trigger speed for the gear shift to be implemented depends, furthermore, on an actual prime mover torque that is actually provided, preferably depending on a difference or a ratio between the driver-input torque and the actual prime mover torque that is actually provided. For the case in which the trigger speed is adapted for the gear shift to be implemented also depending on the actual prime mover torque that is actually provided, and, in fact, preferably depending on the difference or the ratio between the driver-input torque and the actual prime mover torque that is actually provided, the trigger speed can be even more advantageously adapted and, in fact, while avoiding acceleration losses and avoiding an intervention of a governor.

According to one advantageous example refinement of the invention, depending on the driver-input torque and preferably depending on the difference or the ratio between the driver-input torque and the actual prime mover torque that is actually provided, an offset value is preferably determined in a characteristic map-dependent manner, via which the trigger speed for the gear shift to be implemented is adapted. The determination of an offset value, as a function of which the trigger speed is adapted, is particularly preferred.

Preferably, for the case in which the driver-input torque is lower than a limit value, an offset value is predefined that is identical for all differences or ratios between the driver-input torque and the actual prime mover torque that is actually provided. Preferably, for the case in which the driver-input torque is greater than a limit value, an offset value is predefined that is that much greater, the greater the difference or the ratio is between the driver-input torque and the actual prime mover torque that is actually provided. This permits a particularly advantageous adaptation of the trigger speed for the gear shift to be implemented while avoiding acceleration losses and avoiding an intervention of a governor.

BRIEF DESCRIPTION OF THE DRAWINGS

Exemplary embodiments of the invention are explained in greater detail with reference to the drawings, without being limited thereto, in which.

DETAILED DESCRIPTION

Figure 1:
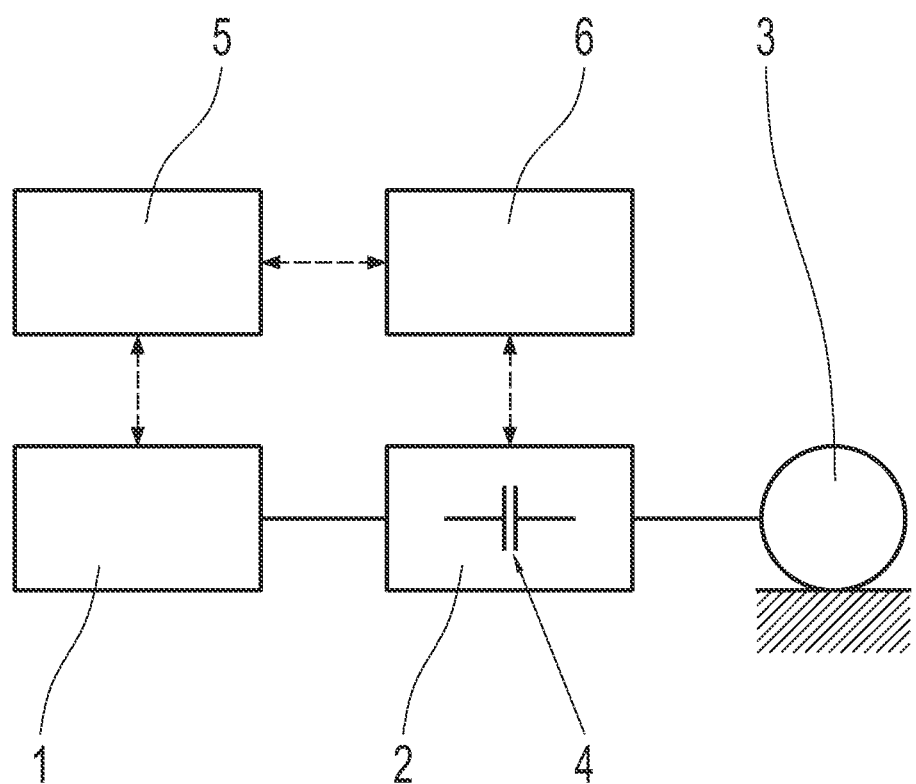
FIG. 1 shows a diagram of a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a highly schematic diagram of a drive train of a motor vehicle, wherein the motor vehicle includes a prime mover 1, a transmission 2, and a driven end 3.

The prime mover 1 can be an internal combustion engine. Moreover, the prime mover 1 can be an electric machine. In a hybrid vehicle, the prime mover 1 includes an internal combustion engine as well as an electric machine.

The transmission 2 is connected between the prime mover 1 and the driven end 3. The transmission 2 converts rotational speeds and torques and provides an available tractive force of the prime mover 1 at the driven end 3.

The transmission 2 is an automatic geared transmission, which provides multiple gears. The transmission 2 includes multiple shift elements 4, which can be designed as friction-locking shift elements and/or also as form-locking shift elements. A defined gear is engaged in the transmission 2 depending on which shift elements 4 of the transmission 2 are engaged or disengaged.

If a gear change or a gear shift is to take place from an actual gear into a target gear, at least one previously engaged shift element 4 is disengaged and at least one previously disengaged shift element 4 is engaged.

FIG. 1 also shows control-side assemblies, namely a prime mover control unit 5 for the open-loop and/or closed-loop control of the operation of the prime mover 1 and a transmission control unit 6 for the open-loop and/or closed-loop control of the operation of the transmission 2. According to the dashed-line arrows, the prime mover control unit 5 exchanges data with the prime mover 1 and the transmission control unit 6 exchanges data with the transmission 2. Furthermore, the prime mover control unit 5 and the transmission control unit 6 exchange data with each other.

As mentioned above, a gear shift or a gear change from an actual gear into a target gear can be implemented in the transmission 2. A gear shift of this type is triggered on the control side and, in fact, by the transmission control unit 6, namely for the case in which a motor vehicle-side rotational speed, in particular a rotational speed of the driven end 3 or a rotational speed of the prime mover 1, reaches or exceeds a trigger speed.

The rotational speed of the prime mover 1 is in a defined ratio with respect to the rotational speed at the driven end 3 depending on the ratio of the actual gear engaged in the transmission 2.

The gear shift can also be triggered as a function of a transmission-side rotational speed.

Figure 2:
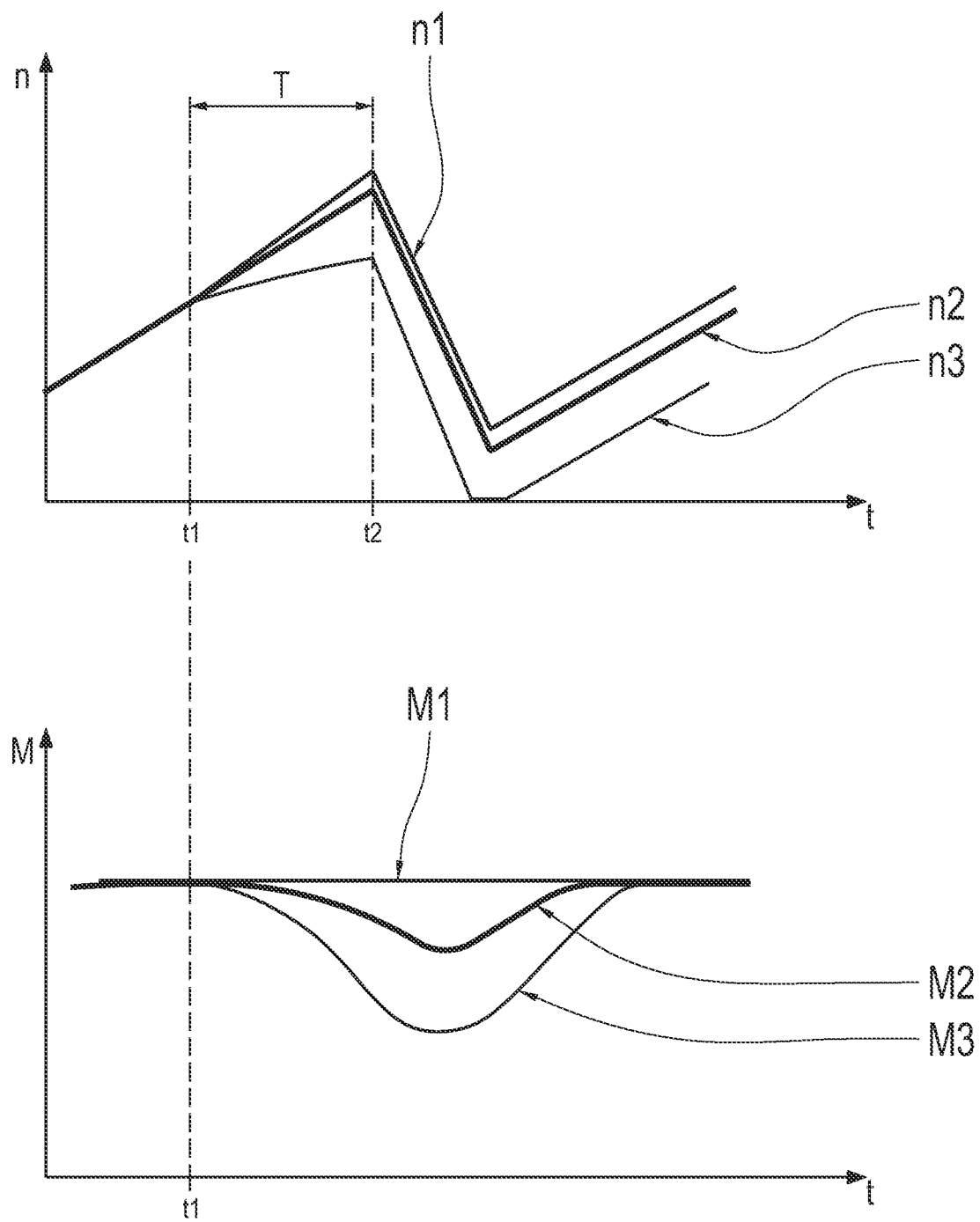
FIG. 2 shows a time-dependency diagram with rotational speed and torque profiles during the implementation of an upshift.

In FIG. 2, profiles of rotational speeds n and torques M that can arise upon implementation of an upshift in the transmission 2 are shown with respect to time t.

At a point in time t1, the implementation of an upshift in the transmission 2 is demanded on the control side. A speed transition first begins at the point in time t2 from a synchronous speed of the actual gear of the upshift to be implemented toward a synchronous speed of the target gear of the upshift to be implemented, wherein the period of time T between the points in time t2 and t1 is also referred to as the response time t of the gear shift to be implemented.

During an implementation of an upshift, the speed profile n1 from FIG. 2 forms for the case in which the prime mover 1 provides a constant torque M1 during the implementation of the gear shift.

During the implementation of an upshift in the transmission 2, it is to be expected that the torque M provided by the prime mover 1 is not constant. The torque profiles M2 and M3 from FIG. 2 show torque profiles for cases in which the torque provided by the prime mover 1 temporarily decreases during the implementation of the gear shift, as the result of which the speed profiles n2 and n3 form during the implementation of the gear shift, namely the speed profile n2 for the torque M2 and the speed profile n3 for the torque M3. FIG. 2 shows that the rotational speed at the end of the response time T is that much lower, the greater is the extent to which the torque that the prime mover 1 provides during the implementation of the gear shift decreases during the gear shift implementation.

Example aspects of the invention now relates to optimally determining a trigger speed, as a function of which an upshift to be implemented, such as an upshift in the transmission 2, is triggered on the control side and, in fact, in such a way that acceleration losses are avoided during the implementation of the upshift and, moreover, in such a way that a governing of the rotational speed of the prime mover 1 can be avoided.

In order to ascertain the trigger speed for a gear shift to be implemented in the transmission 2, the trigger speed, as a function of which the upshift to be implemented is triggered on the control side, namely for the case in which the particular motor vehicle-side rotational speed reaches or exceeds the trigger speed, is determined depending on the response time T of the gear shift to be implemented, which is known on the control side, depending on the gradient of the particular motor vehicle-side rotational speed n, which is also known on the control side, and depending on a maximum permissible limit speed of the upshift to be implemented, which the particular motor vehicle-side rotational speed is permitted to have, at most, at the end of the response time T and which is predefined on the control side. Such a determination of the trigger speed is already known, for example, from DE 10 2006 016 710 A1.

According to example aspects of the invention, it is provided that the trigger speed, which was determined depending on the response time T of the gear shift to be implemented, depending on the gradient of the particular motor vehicle-side rotational speed, and depending on the maximum permissible limit speed of the particular motor vehicle-side rotational speed, is adapted and, in fact, depending on a driver-input torque and, preferably, also depending on an actual prime mover torque that is actually provided by the prime mover 1. In particular, the adaptation of the trigger speed takes place depending on the driver-input torque and depending on a difference or a ratio between the driver-input torque and the actual prime mover torque that is actually provided by the prime mover 1. In the following, reference is made to the difference between the driver-input torque and the actual prime mover torque that is actually provided.

Figure 3:
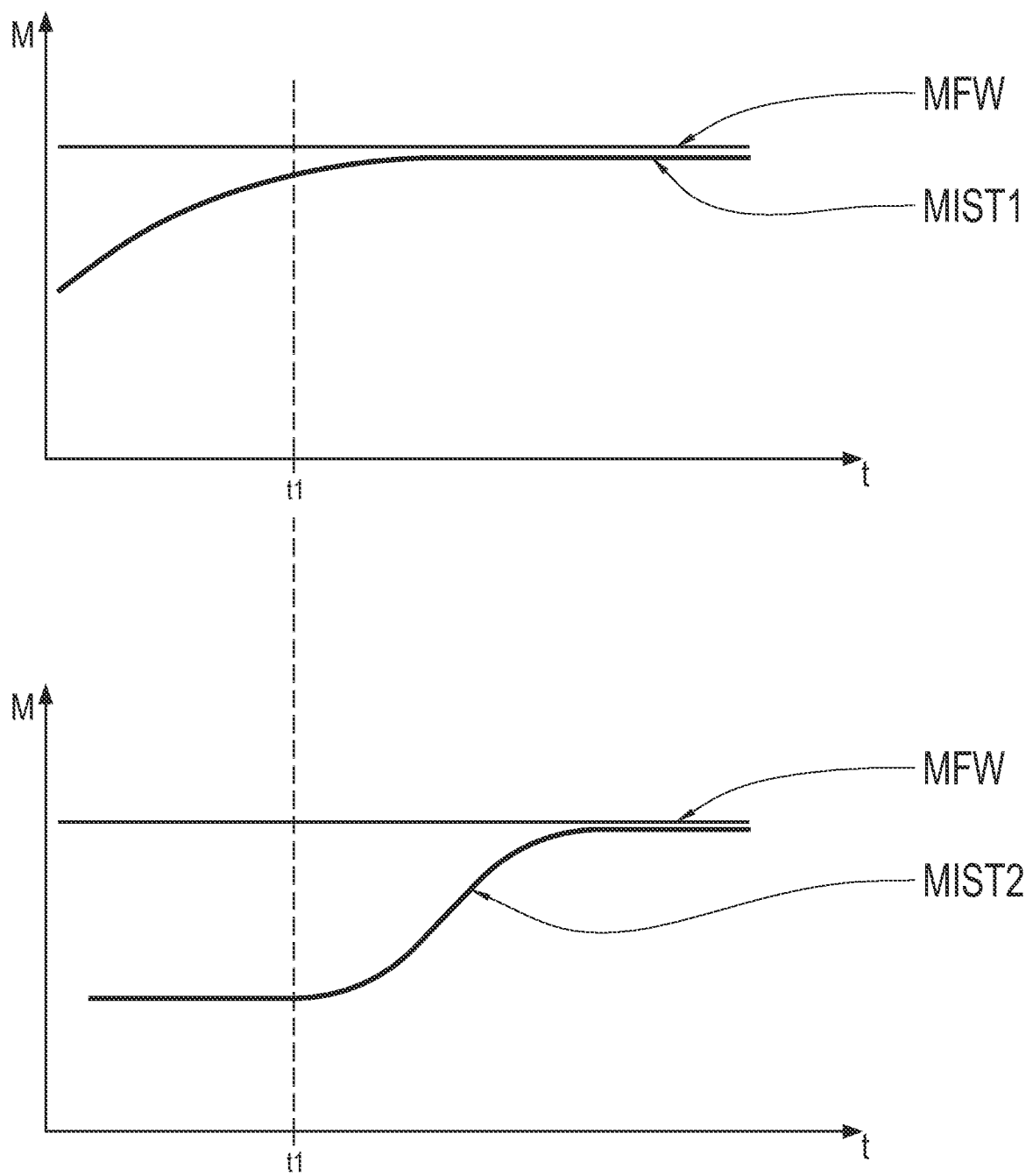
FIG. 3 shows a time-dependency diagram with further torque profiles.

In FIG. 3, torque profiles are shown with respect to time t, namely profiles of a driver-input torque MFW and profiles of an actual prime mover torque MIST provided by the prime mover 1. At the point in time of the gear shift implementation at the point in time t1, the actual prime mover torque MIST1 is closer to the driver-input torque MFW than the actual prime mover torque MIST2.

Example aspects of the invention provide that, depending on the driver-input torque MFW and, preferably, depending on the actual prime mover torque MIST that is actually provided by the prime mover 1, the trigger speed, which was determined depending on the response time T, depending on the gradient of the particular motor vehicle-side rotational speed, and depending on the maximum permissible limit speed for the particular motor vehicle-side rotational speed, can advantageously be adapted in order to implement an upshift with the lowest acceleration losses possible, on the one hand, and, on the other hand, avoid a governing of the rotational speed of the prime mover 1. In the process, an offset value is determined preferably depending on the driver-input torque and depending on the difference between the driver-input torque and the actual prime mover torque that is actually provided by the prime mover 1, on the basis of which the trigger speed is adapted, wherein this offset value is preferably ascertained in a manner dependent on a characteristic map.

The offset value is preferably ascertained in such a way that, for the case in which the driver-input torque is lower than a limit value, an offset value is predefined that is identical for all differences between the driver-input torque and the actual prime mover torque that is actually provided.

However, if the driver-input torque is greater than a limit value, an offset value is preferably predefined that is that much greater, the greater the difference is between the driver-input torque and the actual prime mover torque that is actually provided.

The following table represents this type of characteristic map, by way of example.

| Difference [Nm] Driver-input torque | Driver-input torque [Nm] | | | | |
| --- | --- | --- | --- | --- | --- |
| Actual prime mover torque | 300 | 350 | 450 | 500 | 600 |
| 100 | −50 | −50 | −10 | 0 | 0 |
| 130 | −50 | −50 | −25 | 0 | 0 |
| 150 | −50 | −50 | −50 | −40 | −40 |
| 170 | −50 | −50 | −75 | −75 | −75 |
| 220 | −50 | −50 | −80 | −80 | −80 |

From the table presented above, it can be gathered that, for the case in which the driver-input torque is less than a limit value, in particular less than 400 Nm, a constant offset value of −50 rpm is predefined for all differences between the driver-input torque and the actual prime mover torque.

However, if the driver-input torque is greater than a limit value, in particular, therefore, greater than 400 Nm, the size of the offset value depends not only on the driver-input torque, but also on the difference between the driver-input torque and the actual prime mover torque, wherein the offset value is that much greater, the greater the difference is between the driver-input torque and the actual prime mover torque.

The trigger speed, which was determined depending on the response time T, depending on the gradient of the particular motor vehicle-side rotational speed, and depending on the maximum permissible limit speed for the particular motor vehicle-side rotational speed, is calculated with the offset value.

The method is utilized particularly advantageously in traction upshifts.

In the case of a hybrid vehicle, the driver-input torque and the actual prime mover torque that is actually provided are cumulative torques of the internal combustion engine and the electric machine.

The driver-input torque, the actual prime mover torque that is actually provided, and the difference or the ratio between the driver-input torque and the actual prime mover torque that is actually provided can be smoothed with a filter and debounced with respect to time.

Example aspects of the invention also provide a control unit for operating the transmission 2 of the motor vehicle, wherein the control unit is the transmission control unit 6. The control unit is configured for implementing the above-described method on the control side. In order to implement a gear shift in the transmission, the control unit determines the trigger speed for the gear shift depending on the response time T of the gear shift to be implemented, depending on the gradient of the rotational speed of the prime mover 1 and/or of the driven end 3, and depending on a maximum permissible limit speed for the rotational speed of the prime mover 1 and/or of the driven end 3. The trigger speed determined in this way is adapted and, in fact, depending on the driver-input torque and, preferably, depending on the difference between the driver-input torque and the actual prime mover torque that is actually provided by the prime mover 1 and, in fact, in particular to determine a characteristic map-dependent offset value.

The control unit 6 includes components for implementing the method according to example aspects of the invention on the control side, namely via hardware-related means and software-related means.

The hardware-related means include data interfaces for exchanging data with assemblies contributing to the implementation of the method according to example aspects of the invention. Moreover, the hardware-related means include a processor for data processing and a memory for data storage. The software-related means include program modules, which are implemented for carrying out the method according to example aspects of the invention in the control unit 6.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

1 prime mover
2 transmission
3 driven end 4 shift element
5 prime mover control unit
6 transmission control unit

The invention claimed is:

1. A method for operating a transmission (2) of a motor vehicle, comprising:
   in order to trigger a gear shift in the transmission (2), determining a trigger speed depending on a response time of the gear shift to be implemented, depending on a gradient of a motor vehicle-side rotational speed, and depending on a maximum permissible limit speed for the motor vehicle-side rotational speed, wherein the gear shift to be implemented is triggered on a control side as a function of the trigger speed such that the motor vehicle-side rotational speed does not exceed the maximum permissible limit speed during implementation of the gear shift; and
   adapting the trigger speed depending on a driver-input torque.

2. The method of claim 1, wherein determining the trigger speed further depends on an actual prime mover torque that is actually provided.

3. The method of claim 2, wherein adapting the trigger speed comprising adapting the trigger speed depending on a difference or a ratio between the driver-input torque and the actual prime mover torque that is actually provided.

4. The method of claim 1, further comprising determining an offset value depending on the driver-input torque, wherein adapting the trigger speed comprises adapting the trigger speed via the offset value.

5. The method of claim 4, wherein determining the offset value further depends on an actual prime mover torque that is actually provided.

6. The method of claim 5, wherein determining the offset value further depends on a difference or a ratio between the driver-input torque and the actual prime mover torque that is actually provided.

7. The method of claim 4, wherein determining the offset value comprising ascertaining the offset value with a characteristic map.

8. The method of claim 4, wherein, when the driver-input torque is less than a limit value, determining the offset value comprises determining a predefined offset value that is identical for all differences or ratios between the driver-input torque and an actual prime mover torque that is actually provided.

9. The method of claim 4, wherein, when the driver-input torque is greater than a limit value, determining the offset value comprises determining a predefined offset value that increases as a difference or a ratio between the driver-input torque and an actual prime mover torque that is actually provided increases.

10. A control unit configured for implementing the method of claim 1.

11. A control unit (6) for operating a transmission (2) of a motor vehicle, the control unit configured for:
    in order to trigger a gear shift in the transmission (2), determining a trigger speed depending on a response time of the gear shift to be implemented, depending on a gradient of a motor vehicle-side rotational speed, and depending on a maximum permissible limit speed for the motor vehicle-side rotational speed, wherein the gear shift to be implemented is triggered on a control side as a function of the trigger speed such that the motor vehicle-side rotational speed does not exceed the maximum permissible limit speed during implementation of the gear shift; and
    adapting the trigger speed depending on a driver-input torque.

* * * * *